(12) United States Patent
Ogata

(10) Patent No.: US 8,441,902 B2
(45) Date of Patent: May 14, 2013

(54) OPTICAL INFORMATION RECORDING/REPRODUCING DEVICE, OPTICAL INFORMATION REPRODUCING DEVICE, AND OPTICAL INFORMATION RECORDING MEDIUM

(75) Inventor: Takeshi Ogata, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 100 days.

(21) Appl. No.: 12/611,462

(22) Filed: Nov. 3, 2009

(65) Prior Publication Data

US 2010/0220566 A1 Sep. 2, 2010

(30) Foreign Application Priority Data

Mar. 2, 2009 (JP) ................................. 2009-047505

(51) Int. Cl.
*G11B 20/18* (2006.01)
(52) U.S. Cl.
USPC ..................................... 369/53.17; 369/47.14
(58) Field of Classification Search .................... None
See application file for complete search history.

(56) References Cited

U.S. PATENT DOCUMENTS

| | | | | |
|---|---|---|---|---|
| 6,032,276 | A * | 2/2000 | Tomishima | .................... 714/723 |
| 2002/0159376 | A1 | 10/2002 | Ohsawa | |
| 2003/0031106 | A1 * | 2/2003 | Ozaki | ........................ 369/53.17 |
| 2003/0137909 | A1 | 7/2003 | Ito et al. | |
| 2003/0137910 | A1 | 7/2003 | Ueda et al. | |
| 2005/0210319 | A1 * | 9/2005 | Kim et al. | ........................ 714/8 |
| 2007/0189138 | A1 * | 8/2007 | Kuroda et al. | ............ 369/47.51 |
| 2008/0239902 | A1 * | 10/2008 | Hirai | ........................... 369/53.17 |
| 2009/0092014 | A1 * | 4/2009 | Tanaka et al. | .............. 369/47.14 |

FOREIGN PATENT DOCUMENTS

| | | |
|---|---|---|
| JP | 07-235140 | 9/1995 |
| JP | 2001-014808 | 1/2001 |
| JP | 2002-133788 | 5/2002 |
| JP | 2002-329330 | 11/2002 |
| JP | 2003-323769 | 11/2003 |
| JP | 2005-044509 | 2/2005 |
| JP | 2007-334940 | 12/2007 |

OTHER PUBLICATIONS

Notification of First Office Action, Chinese Application No. 200910205416.6.

* cited by examiner

*Primary Examiner* — Christopher R Lamb
(74) *Attorney, Agent, or Firm* — McDermott Will & Emery LLP

(57) ABSTRACT

The purpose of the present invention is to provide an optical information recording/reproducing device and the like that can suppress a decrease in a recording speed even where an optical information recording medium including multiple layers has eccentricity. The optical information recording/reproducing device records information, by treating a predefined area in a second layer corresponding to a position of a first layer at which a defect is detected, as a defect area. The optical information recording/reproducing device reproduces information, by treating a predefined area in the second layer corresponding to a position of the first layer at which a defect is registered, as a defect area. The radial distance of the defect area is preferably greater than a bonding error between the first and second layers.

10 Claims, 12 Drawing Sheets

FIG. 12

| | DEFECT DETECTION AREA 1 | DEFECT DETECTION AREA 2 | ... | DEFECT DETECTION AREA n |
|---|---|---|---|---|
| 1201 ADDRESS OF FIRST RECORDING LAYER | 0x10000 ~ 0x10100 | 0x10101 ~ 0x10205 | ... | 0x1FC01 ~ 0x1FFFF |
| 1202 ADDRESS OF SECOND RECORDING LAYER | 0x20000 ~ 0x20100 | 0x20101 ~ 0x20205 | ... | 0x2FC01 ~ 0x2FFFF |

| 1301 DEFECT ADDRESS | 1302 DEFECT AREA INFORMATION | OTHER DATA |
|---|---|---|
| 0x10010 – 0x10015 | 1 | |
| 0x20200 – 0x20203 | 2 | |
| ... | ... | ... |

1300

OPTICAL INFORMATION RECORDING/REPRODUCING DEVICE, OPTICAL INFORMATION REPRODUCING DEVICE, AND OPTICAL INFORMATION RECORDING MEDIUM

INCORPORATION BY REFERENCE

The present application claims priority from Japanese application JP2009-047505 filed on Mar. 2, 2009, the content of which is hereby incorporated by reference into this application.

BACKGROUND OF THE INVENTION

The present invention relates to optical information recording/reproducing devices, optical information reproducing devices, and optical information recording media.

In JP-A-2001-14808 (the paragraph of "Effect of the Invention"), it is described that "In an optical disc including a plurality of recording layers such as a one-sided two-layer medium, a defect list including information about medium defects is recorded in at least one recording layer, and the defect list has information about medium defects of all the recording layers regardless of the numbers and positions of the recording layers in which the defect list is recorded, whereby the reliability of defect management and the high speed access can be improved."

Moreover, in JP-A-2007-334940 (the paragraph of "Problems to be Solved"), it is described that "If there is a defect at physically the same position viewed from the disc surface of each recording layer of a multilayer optical disc or if there is a defect such as a scratch or dust on the disc surface, then the defect causes the failure to write in a certain layer and an address of the defect is registered in a defect list. However, in another occasion, the same defect which was previously detected causes the failure to write at physically the same position viewed from a disc surface of another layer, and the address is registered in the defect list again. Since such duplication of effort may occur, there has been a waste in the registration processing of the defect list during writing." Moreover, in the paragraph of "Effect of the Invention", it is described that "Assuming that there is a defect at physically the same position viewed from the disc surface of each recording layer, or that there is a defect such as a scratch and dust on the disc surface, the address of a defect area of a recording layer being accessed and the address at physically the same position viewed from the disc surface of another recording layer are registered in the defect list. As a result, the efficiency of registration to the defect list is increased and the processing speed during writing can be improved."

SUMMARY OF THE INVENTION

However, in order to realize the technique described in JP-A-2007-334940, the optical information recording medium needs to be created while bonding the respective recording layers is precisely controlled in both the angular direction and the radial direction.

For example, in the case of a disc compliant with Blu-Ray Specification, an address to be registered as a defect will change if the bonding position deviates just by 0.23 µm.

However, usually, in an optical information recording medium including multiple layers, the eccentricity of each layer is approximately 50 µm at the maximum. Moreover, in the case of bonding a certain layer to the other layer, usually the angular phase of each layer is not aligned with each other.

Accordingly, if a certain layer is bonded to the other layer, the direction of eccentricity of each layer may become completely opposite to each other. That is, in the case of bonding in an ordinary optical information recording medium, a difference of the relative eccentricity between layers (hereinafter, referred to as a bonding error) is approximately 100 µm at the maximum.

Accordingly, it is difficult to make the address of each layer indicating the same physical position correspond to each other. Then, even if an address of a portion at which a defect has been detected during recording or reproducing in a certain layer is acquired and an address of the other layer that would correspond to the address is also acquired, the defect is most likely to be detected at a different portion from the portion indicated by the address of the other layer. Then, at the different portion, information is recorded or reproduced as with at a portion at which there is no defect, although the defect will be detected again. For example, although there is a defect, the same number of retries as the one in the case of no defect are performed, resulting in an increase in the processing time. It is therefore difficult to improve the recording speed, for example.

However, JP-A-2007-334940 does not describe such a problem.

It is a purpose of the present invention to provide an optical information recording/reproducing device that can suppress a decrease in the recording speed even where an optical information recording medium including multiple layers has eccentricity.

It is another purpose of the present invention to provide an optical information recording/reproducing device that can suppress a decrease in the reproduction speed even where an optical information recording medium including multiple layers has eccentricity.

It is yet another purpose of the present invention to provide an optical information recording medium that can suppress a decrease in the recording speed or reproduction speed of an optical information recording/reproducing device even where the optical information recording medium has eccentricity.

The above-described problems are solved by the claimed invention, for example. The key points are briefly described below.

An optical information recording/reproducing device records information, by treating a predefined area in a second layer corresponding to a position of a first layer at which a defect is detected, as a defect area. The optical information recording/reproducing device reproduces information, by treating the predefined area in the second layer corresponding to a position of the first layer at which a defect is registered, as a defect area. The radial distance of the defect area is preferably greater than a bonding error between the first and second layers.

Moreover, a predefined area in the second layer corresponding to a defect position of the first layer of an optical information recording medium is registered as a defect area. Then, the radial distance of the defect area is greater than a bonding error between the first and second layers.

The present invention can provide an optical information recording/reproducing device that can suppress a decrease in the recording speed even where an optical information recording medium including multiple layers has eccentricity.

Moreover, the present invention can provide an optical information recording/reproducing device that can suppress a decrease in the reproduction speed even where an optical information recording medium including multiple layers has eccentricity.

Moreover, the present invention can provide an optical information recording medium that can suppress a decrease in the recording speed or reproduction speed of an optical information recording/reproducing device even where the optical information recording medium has eccentricity.

Other objects, features and advantages of the invention will become apparent from the following description of the embodiments of the invention taken in conjunction with the accompanying drawings.

BRIEF DESCRIPTION OF THE DRAWINGS

FIG. 12 shows area definition information.

FIG. 13 shows an example of defect management information.

DETAILED DESCRIPTION OF THE EMBODIMENTS

Hereinafter, embodiments of the present invention will be described. Note that, an optical information recording medium 100 is an optical disc, for example a BD but not limited thereto. The present invention can be applied to various media. Preferably, the optical information recording medium 100 is a multilayer recording medium including two or more layers, wherein a bonding error is equal to or greater than a distance between tracks or pits in one layer. Moreover, an optical information recording/reproducing device 400 is an optical disc drive device, for example, but the optical information recording/reproducing device 400 may be any device capable of recording or reproducing information on or from the optical information recording medium 100. The optical information recording/reproducing device 400 may also be a device such as a PC or a storage device with an optical disc drive device.

Embodiment 1

The optical information recording medium 100 is described using Embodiment 1. While the optical information recording medium 100 of this embodiment is configured generally compliant with Blu-Ray Disc Recordable Specification, the optical information recording medium 100 includes a configuration such as a defect management area 301, as described later, which is different from the Specification.

Figure 1:
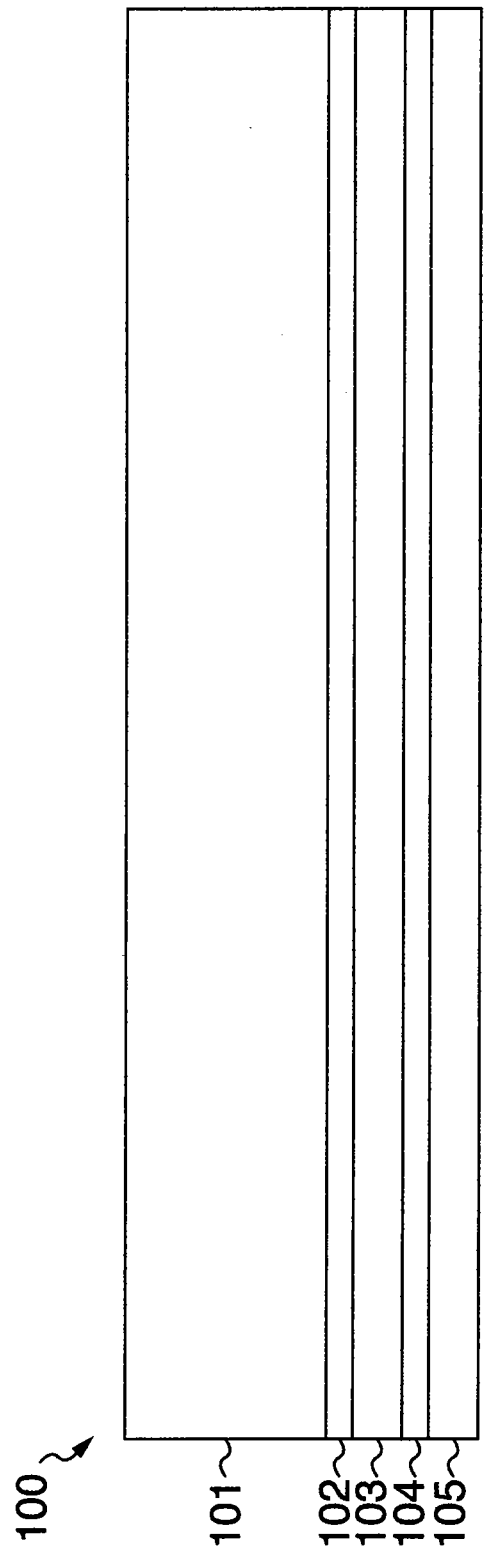
FIG. 1 illustrates an optical information recording medium including two recording layers (Embodiment 1).

FIG. 1 illustrates the layer structure of the optical information recording medium 100.

As illustrated, the optical information recording medium 100 has two recording layers: a first recording layer 102; and a second recording layer 104.

As shown in FIG. 1, specifically, the optical information recording medium 100 has a laminated structure of: a base layer 101; the first recording layer 102; a first intermediate layer 103; the second recording layer 104; and a cover layer 105.

Note that, the optical information recording medium 100 illustrated in FIG. 1 has two recording layers, but in the case of the optical information recording medium 100 having more recording layers, the number of recording layers may be increased by increasing the number of intermediate layers and recording layers, respectively.

Figure 2:
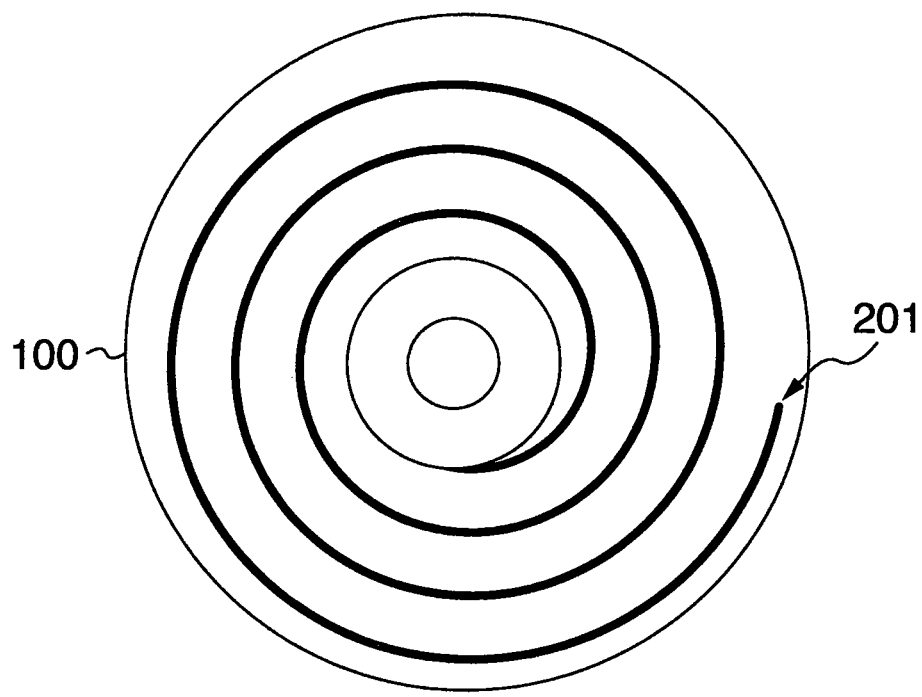
FIG. 2 illustrates a structure of the recording layer (Embodiment 1).

Next, an example of the structure of the second recording layer 104 is described using FIG. 2.

In FIG. 2, the second recording layer 104 has a spiral recording track 201, wherein an optical information is recorded along the recording track 201. In the figure, although the rotation of the spiral recording track 201 is clockwise, it may be either counterclockwise or clockwise. Even if the track 201 of the first recording layer 102 and the track 201 of the second recording layer 104 are spiral in mutually opposite directions, there is no problem. Moreover, the recording track 201 may have a concentric structure instead of the spiral structure.

Figure 3:
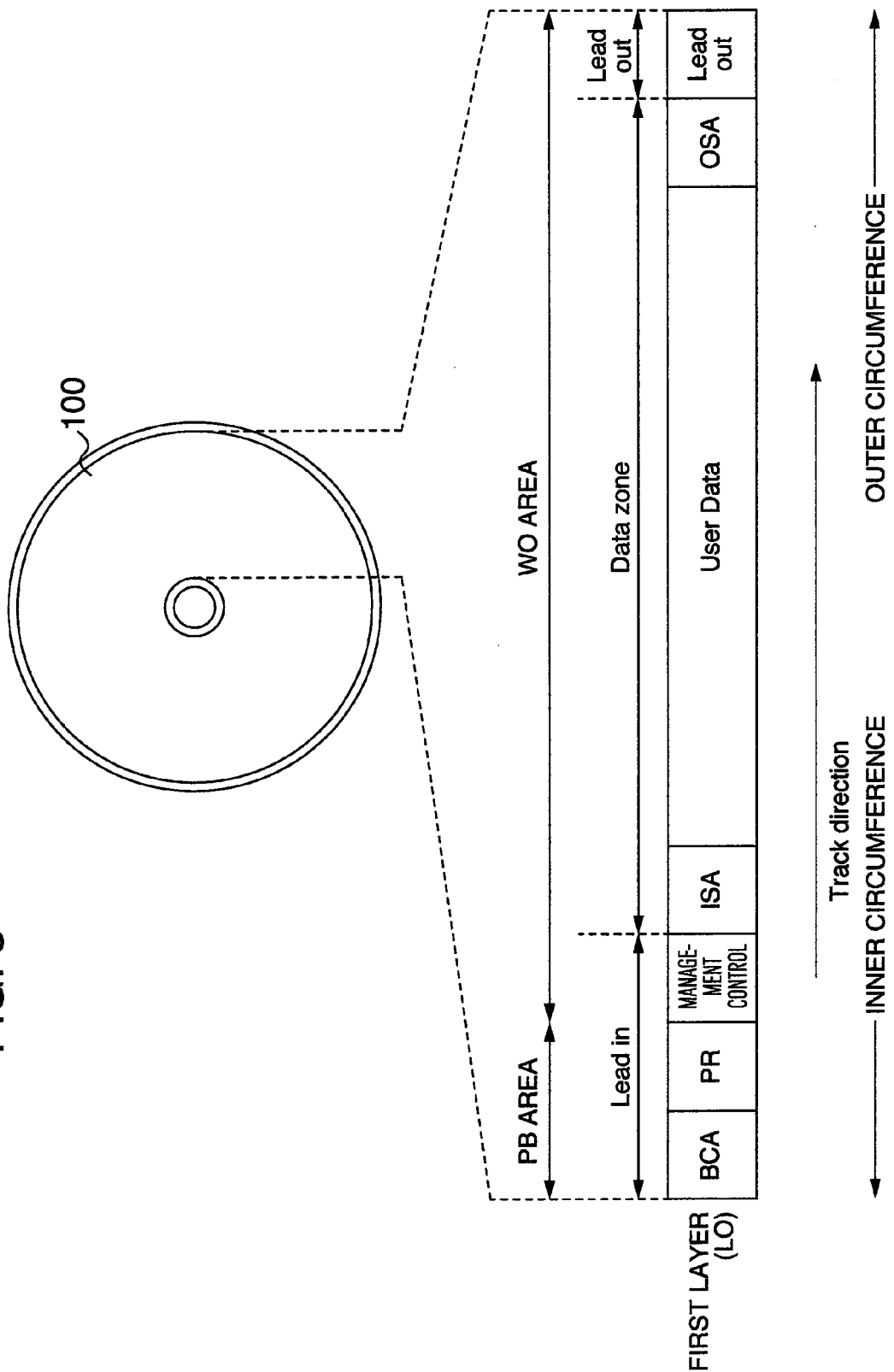
FIG. 3 shows areas of the recording layer in which data is recorded.

Next, an example of data recorded in the recording layer is described using FIG. 3.

The data recorded in the recording layer is divided generally into a lead-in area, a data zone area, and a lead-out area according to the address, as shown in FIG. 3.

An area including a BCA (Burst Cutting Area) and a pre-recorded information area PR at the innermost circumference side in the lead-in area serves as a reproduction-dedicated area (PB area). An area from a management/control information area in the lead-in area to the lead-out area serves as a write-once area (WO area) in which data can be recorded once.

In the BCA (Burst Cutting Area) at the innermost circumference in the lead-in area, a bar code-like signal is recorded in radial direction, using a recording technique by which the recording layer is burned with a high-output laser, for example. Using the BCA, on the optical information recording medium 100, an ID unique to each disc is recorded. Then, using the unique ID, copying contents to the optical information recording medium 100 is managed.

Data is recorded in a wobbling groove (meandering groove) of a recording track, which is spirally formed in the reproduction-dedicated area except the BCA, that is in the pre-recorded information area PR, and in the entire WO area. The wobbling groove serves as a tracking guide in tracing by a laser spot, and the wobbling groove also serves as the recording track 201 used for recording/reproducing data.

This embodiment uses the optical information recording medium 100 employing a groove recording technique by which data is recorded in the groove, but the present invention is not limited to the optical information recording medium 100 employing such a groove recording technique, and the present invention may be applied to the optical information recording medium 100 employing a land recording technique by which data is recorded on a land between grooves. The present invention can also be applied to the optical information recording medium 100 employing a land-groove recording technique by which data is recorded both on lands and in grooves.

Next, effects in the case where there is a defect in the optical information recording medium 100 having two recording layers is described.

In the case of reading information recorded on the optical information recording medium 100, the optical information recording/reproducing device 400 reads a signal by introducing a laser from the surface of the optical information recording medium 100 so as to focus it on a target recording layer.

Moreover, the optical information recording/reproducing device uses a laser signal reflected from the recording layer in order to control focusing it on a target recording layer or tracking to the recording track 201.

Moreover, the optical information recording/reproducing device similarly uses the laser signal reflected from the recording layer in order to control reading recorded data.

Figure 11:
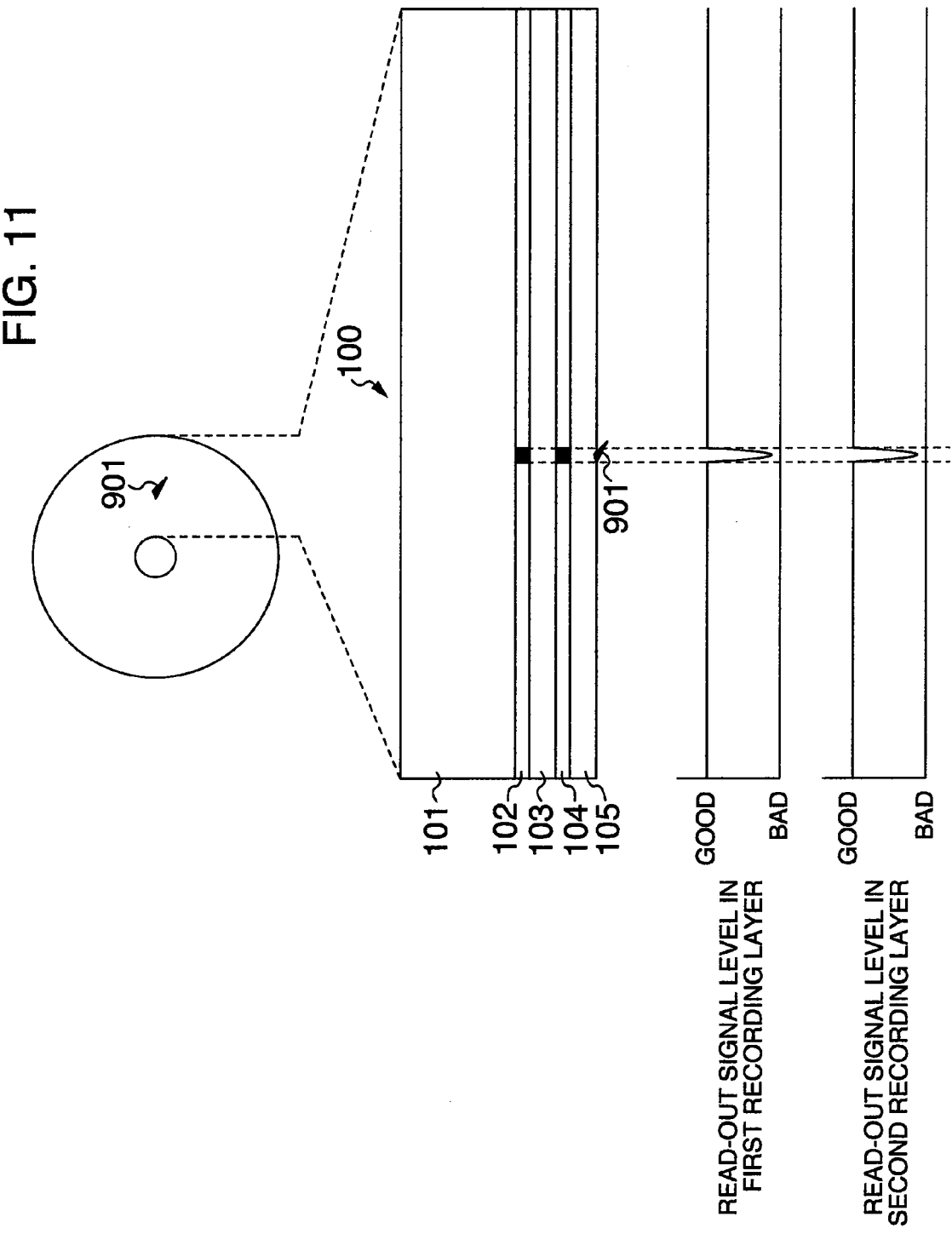
FIG. 11 shows a reproduced signal level of each recording layer in the case where there is a scratch on a surface.

Here, FIG. 11 shows a read-out signal level of each layer in the case where there is a scratch 901 on the surface of the optical information recording medium 100.

If there is the scratch 901 on the surface of the optical information recording medium 100, only at a portion of the scratch 901 a laser is diffused by the scratch 901 and the level of a signal reflected from the recording surface will degrade at the recording layer portions in the back of the scratch 901. Therefore, at the recording layer portions in the back of the scratch 901, signals used in order to control focusing and tracking will degrade, thus causing an out-of-control servo problem.

Figure 4:
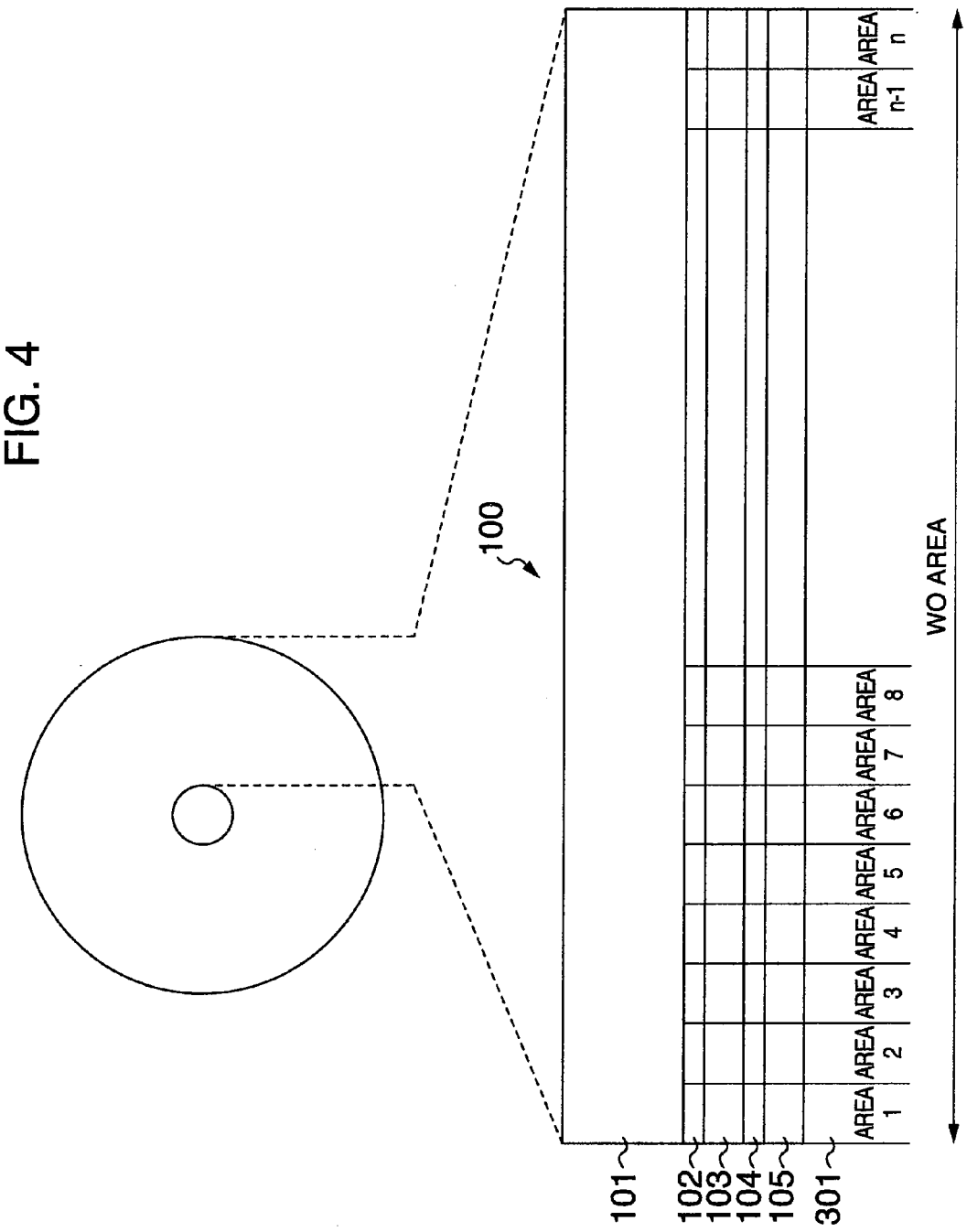
FIG. 4 shows a defect detection area (Embodiment 1).

Next, the defect detection area 301 is described using FIG. 4.

The optical information recording medium 100 includes defect detection areas 301 that are radially divided and defined areas. In the figure, Area 1 to Area n are defined as defect detection areas 301.

Moreover, in this embodiment, the defect detection area 301 is defined depending only on the radius. For this reason, if the first recording layer 102 and the second recording layer 104 have the same radius, respectively, they include the same defect detection area 301. Note that, the defect detection area 301 depends only on the radius, because when bonding the first recording layer 102 to the second recording layer 104 during manufacturing the optical information recording medium 100, the angular phases of the respective layers are not aligned with each other. Of course, on some medium production method, the defect detection area 301 may be defined depending on the circumferential direction.

Here, area definition information 1200 indicating which address range is defined as a defect detection area is described using FIG. 12. In the figure, reference numeral 1201 represents the address of the first recording layer, and 1202 represents the address of the second recording layer, and 1203 represents numbers of the defect detection areas 301 from Area 1 to Area n corresponding to those address ranges. Using the area definition information 1200, a specific address of the first recording layer can be associated with a defect detection area in the second recording layer. Moreover, using the area definition information 1200, a specific address of the second recording layer can be associated with a defect detection area in the first recording layer. Moreover, the defect detection areas 301 are divided areas based on, for example, an address corresponding to a physical radius in the case where the optical information recording medium 100 has presumably been manufactured without eccentricity or a bonding error, not based on the actual physical radius on the optical information recording medium 100. If the defect detection areas 301 are such divided areas, there is no need to measure the eccentricity of the optical information recording medium 100 or a bonding error of each recording layer.

Moreover, the size in radial direction of this area is a value equal to or greater than the bonding error of the optical information recording medium 100, for example. Thus, where a defect is detected in a certain layer, a range in which defect detection due to the same defect may presumably be performed in the other layer, is included in the same defect detection area 301 or its adjacent defect detection area 301 regardless of the magnitude of the bonding error. Accordingly, the same defect detection area 301 or its adjacent defect detection area 301 can be treated as an area including a defect or an area more likely to include a defect.

Note that, as previously stated, the bonding error is defined as a difference of the relative eccentricity between layers. The bonding error is usually a value of around two times the eccentricity of each layer.

A specific value of the bonding error associated with bonding layers is, for example two times the value of the eccentricity specified by the specification with which the optical information recording medium 100 is compliant. For example, the value of the bonding error associated with bonding is 100 μm as described above, but the invention is not necessarily limited to the value.

While the acceptable range of eccentricity is to be determined based on the specification, the acceptable range of eccentricity also depends on the manufacturer of the optical information recording medium 100 or an individual model. For this reason, a typical bonding error of the optical information recording medium 100 for each manufacturer or each model may be measured in advance so that the optical information recording/reproducing device 400 to be described later may acquire the bonding error based on a unique ID read from the BCA or the management area. Or, an area in which the bonding error is recorded may be provided on the optical information recording medium 100. Of course, in place of the bonding error, a value of two times the eccentricity of each layer may be used as the width of the defect detection area.

Moreover, where a defect is detected in a certain layer and the other layer, respectively, the optical information recording/reproducing device 400 may acquire the value of the bonding error based on a difference at the physical position between a defect address of the certain layer and a defect address of the other layer.

Here, for example, where a defect such as a scratch on the surface of the optical information recording medium 100 is detected in a certain defect detection area 301 of the first recording layer 102, it is presumed that a defect due to the same defect is detected in the same defect detection area 301 of the second recording layer 104.

For this reason, the information about the defect detection area 301 in which a defect is detected is registered so as to make it easy to handle an error that is presumed to be caused by the same defect. Then, for example, the defect detection area 301 is registered on a predefined area of the optical information recording medium 100, for example on the defect management area. Moreover, the defect management area is implemented, for example, by expanding an area such as a DMA in a BD, so as to enable to register the defect detection area 301.

Here, the defect management information 1300 registered on the optical information recording medium 100 is described using FIG. 13. In the figure, reference numeral 1301 represents a defect address. The defect address 1301 is an address indicating a position at which data is being recorded and a defect is detected based on a change in the reflected light amount, a distortion of an error signal, or the like. Moreover, the defect address 1301 may be indicated by a single address, or by an address indicating a predefined recording unit, for example a range of one sector. Defect area information 1302 is information indicating the defect detection area 301 corresponding to the defect address 1301. The defect area information 1302 is determined based on in which defect detection area 301 in FIG. 12 the defect address 1301 is included, for example.

Thus, if not only an address at which a defect is detected but also the defect area information 1302 indicating in which defect detection area 301 the defect is detected are recorded on the information recording medium 100, for example in the management area, there is no need to calculate the defect detection area 301 including a defect portion from the address.

Note that, in this embodiment, the radial distance of the defect detection area 301 is set to a value equal to or greater than the bonding error between layers. This enables to record/reproduce information, by treating the same defect detection area 301 as the one where a defect is detected in a certain layer or its adjacent defect detection area 301, as an area including a defect. However, the radial distance of the defect detection area 301 may not be necessarily greater than the bonding error. For example, even if the radial distance of the defect detection area 301 is set to a value of a half the bonding error, the same defect detection area 301 as the one where the defect is detected in a certain layer or its adjacent defect detection area 301 is most likely to include a defect in the other layer. Then, these areas can be treated as areas that are most likely to include a defect. Where the radial distance of the defect detection area 301 is set to a value of a half the bonding error assuming the values of eccentricity of a certain layer and the other layer are the same, if the angular phase difference in the direction of eccentricity between the certain layer and the other layer is within a range of $0° \leq \theta \leq \pm 90°$, then the same defect will be included in the same defect detection area 301 or its adjacent defect detection area 301.

Moreover, where the radial distance of the defect detection area 301 is set to, for example, a value of 60% of the bonding error, if the angular phase difference in the direction of eccentricity is within a range of $0° \leq \theta \leq \pm$ approximately $101°$, then the same defect will be included in the same defect detection area 301 or its adjacent defect detection area 301. Moreover, where the radial distance of the defect detection area 301 is set to, for example, a value of 70% of the bonding error, if the angular phase difference in the direction of eccentricity is within a range of $0° \leq \theta \leq \pm$ approximately $113°$, then the same defect will be included in the same defect detection area 301 or its adjacent defect detection area 301. Moreover, where the radial distance of the defect detection area 301 is set to, for example, a value of 80% of the bonding error, if the angular phase difference in the direction of eccentricity is within a range of $0° \leq \theta \leq \pm$ approximately $126°$, then the same defect will be included in the same defect detection area 301 or its adjacent defect detection area 301. Moreover, where the radial distance of the defect detection area 301 is set to, for example, a value of 90% of the bonding error, if the angular phase difference in the direction of eccentricity is within a range of $0° \leq \theta \leq \pm$ approximately $143°$, then the same defect will be included in the same defect detection area 301 or its adjacent defect detection area 301.

Moreover, the greater the radial distance of the defect detection area 301, the more likely a defect position in the other layer is to be included in the same defect detection area 301 or its adjacent defect detection area 301.

Moreover, the optical information recording medium 100 may be configured so as to register an area thereon, which is radially wider than a defect portion in a certain layer, as a defect area most likely to include a defect.

Embodiment 2

Embodiment 2 is an example of the operation of the optical information recording/reproducing device 400 during recording on the optical information recording medium 100.

Figure 5:
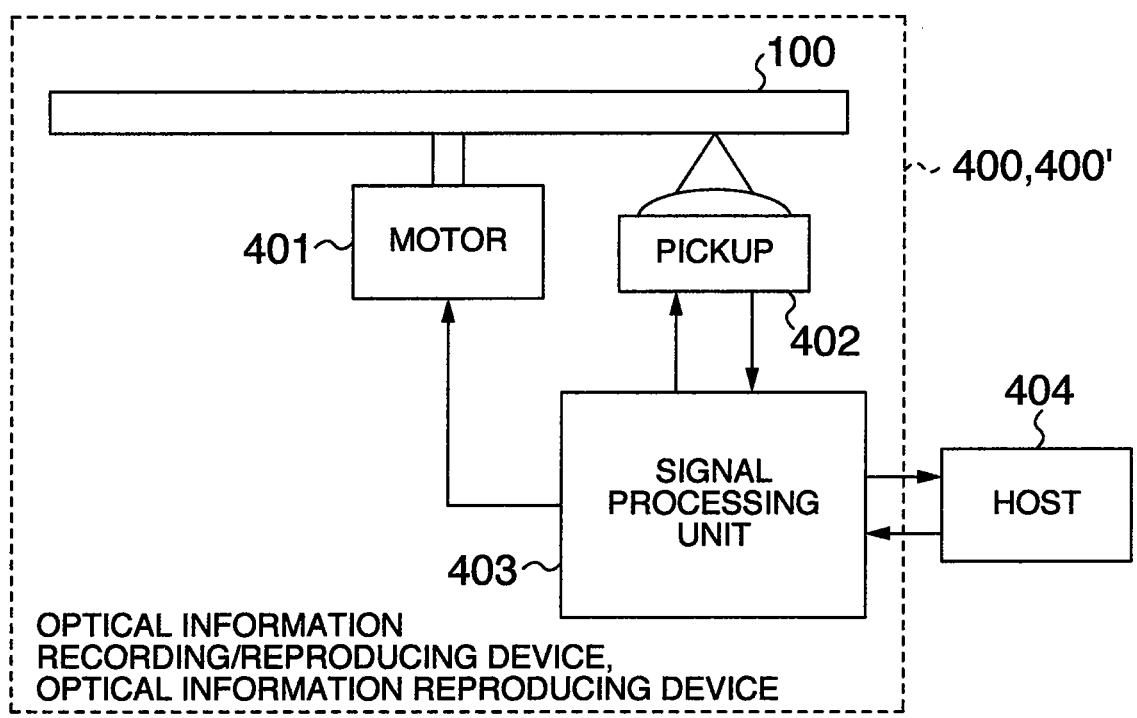
FIG. 5 is a block diagram of an optical information recording/reproducing device.

First, a configuration example of the optical information recording/reproducing device 400 is shown in FIG. 5.

The optical information recording/reproducing device 400 includes a pickup 402 for irradiating with a laser light and converting the light quantity of reflected light into an electric signal. The optical information recording/reproducing device 400 also includes a motor 401 such as a spindle motor or a stepping motor, capable of changing the relative position between the pickup 402 and the optical information recording medium 100. The optical information recording/reproducing device 400 also includes a signal processing unit 403, which controls the pickup 402 and the motor 401 using a signal outputted from the pickup 402, and further records/reproduces data and communicates with a host device 404 to transfer the reproduced data or receive data to be recorded. The signal processing unit 403 may comprise one LSI including all the functions, or may be realized, for example by combining individual processing units for the respective functions such as a unit for processing signals from the pickup 402 and a unit for controlling the pickup 402 and motor 401. The optical information recording/reproducing device 400 further includes a storage unit such as a memory, although not illustrated.

Moreover, the optical information recording/reproducing device 400 is constructed so that the optical information recording medium 100 may be attached to a position so as to be rotated by the motor. The host device 404 is a device such as a PC, a video camera, a TV, or a recorder, for reproducing from or recording on the optical information recording medium 100, and may be any one capable of communicating with the signal processing unit 403.

The method for reading data from the optical information recording medium 100 comprises the steps of: irradiating the optical information recording medium 100 with a laser light from the pickup 402; and sending a light quantity change signal of the reflected laser to the signal processing unit 403.

The signal processing unit 403 generates signals for controlling the position of the pickup 402 and the speed of the motor 401 from the received signal, and sends them to the pickup 402 and the motor 401, respectively. Furthermore, the signal processing unit 403 reproduces the information recorded on the optical information recording medium 100 from the received signal. Note that, the signal processing unit 403 operates as a defect detector for detecting, based on a signal acquired from the pickup 402, whether or not there is any defect at a portion at which information is being recorded or at a portion from which information is being reproduced. The signal processing unit 403 also operates as a controller in the optical information recording/reproducing device 400.

The motor 401 rotates the optical information recording medium 100 at a speed according to a command received from the signal processing unit 403.

Figure 6:
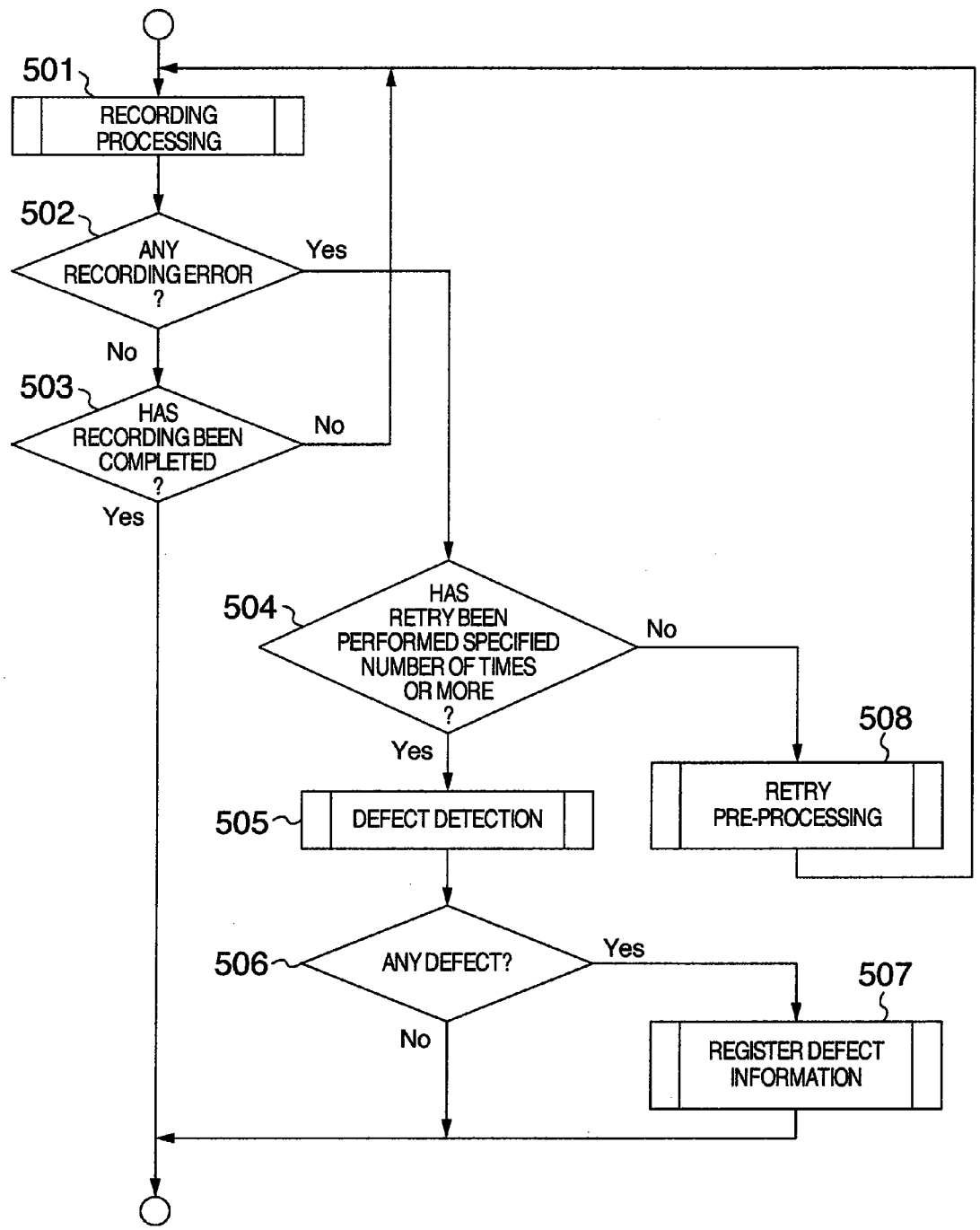
FIG. 6 is an example of a flowchart of a defect detection processing during recording (Embodiment 2).

Next, an example of the flowchart of a conventional defect detection processing during recording is described using FIG. 6, which does not use the present optical information recording medium 100.

During recording data, an optical information recording/reproducing device performs a recording processing, first (S501). Thereafter, the optical information recording/reproducing device confirms whether or not any recording error occurs every time a constant amount of data is recorded or at a constant time interval (S502). Then, where there is no recording error in S502, the optical information recording/ reproducing device confirms whether or not the recording has been completed (S503), and if not, the recording processing 501 is repeated until the recording is completed, and then the processing is completed.

Moreover, where a recording error occurs in S502, the optical information recording/reproducing device determines whether or not retry has been performed a specified number of times or more (S504). Where retry has not been performed the specified number of times in S504, the optical information recording/reproducing device performs retry pre-processing such as the positioning process of an optical pickup (S508), and then performs the recording processing again (S501). Note that, the retry pre-processing refers to, for example a process for returning the irradiating position of a laser light to the error portion using the optical pickup 402 and the motor 401 before performing the recording processing again. Where the retry has been performed the specified number of times by the optical information recording/reproducing device 400 in S504, the optical information recording/reproducing device performs defect detection to determine whether or not there is any defect on the optical information recording medium 100 (S505). The optical information recording/reproducing device performs this process in S505 by detecting a change in the quantity of light reflected from the optical information recording medium 100, a distortion of an error signal or the like.

Thereafter, in S506, the optical information recording/reproducing device determines whether or not there is any defect as a result of the detection (S506). Where there is a defect in S506, the optical information recording/reproducing device registers defect information (S507).

On the other hand, where there is no defect in S506, the optical information recording/reproducing device completes the recording processing as an error as it is.

Thus, in the conventional defect detection method, regardless whether or not there is any defect such as a scratch in a layer being recorded or in the other layer, a specified number of retries is performed. For this reason, where there is a defect particularly in a corresponding portion of the other layer, a specified number of retries is performed although the recording processing is more likely to be unsuccessful even if retried, which invites an increase in the processing time.

Figure 7:
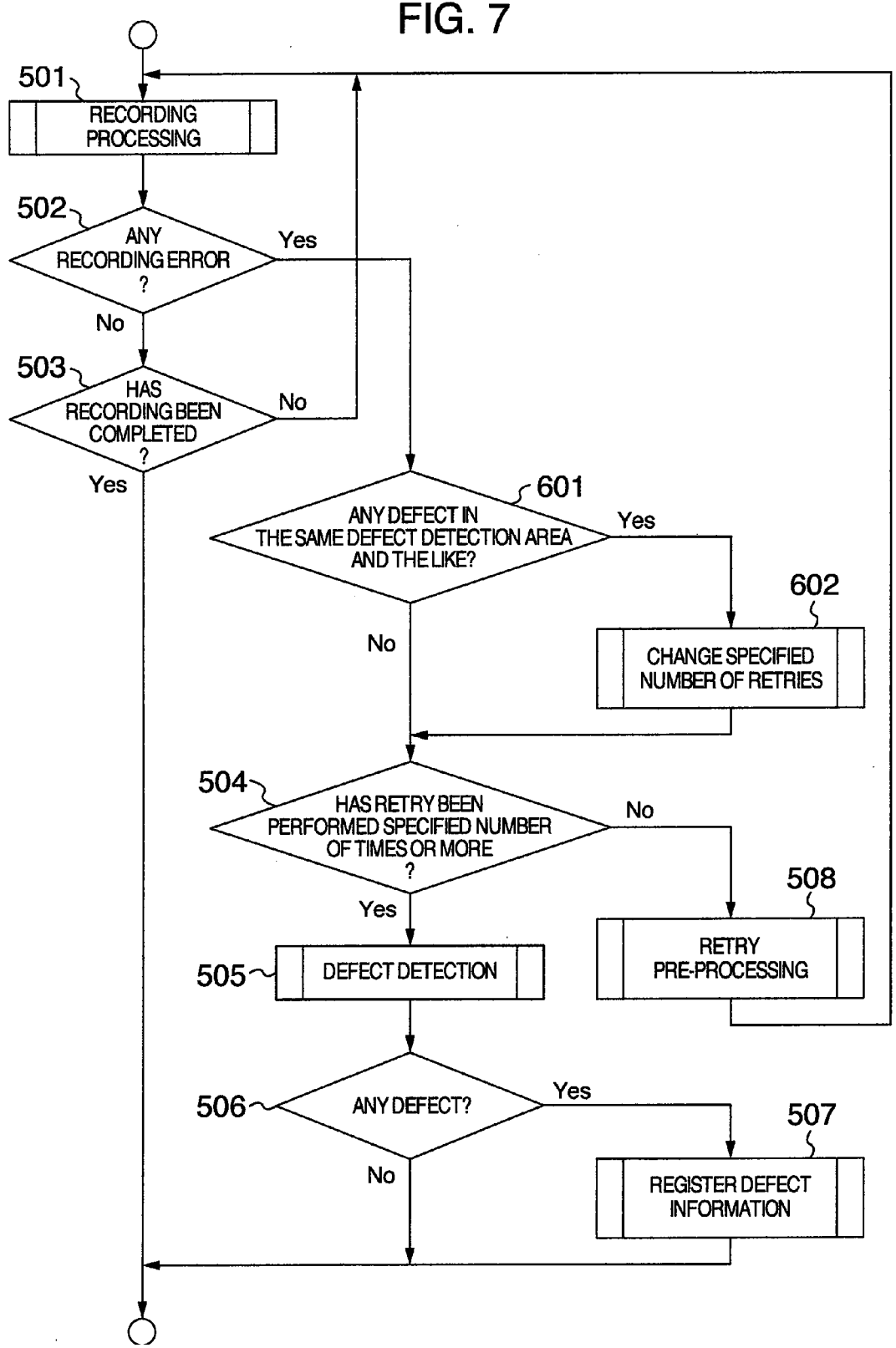
FIG. 7 is an example of a flowchart of defect detection processing using a defect detection area 301 during recording (Embodiment 2).

Next, a defect detection processing during recording using the present optical information recording medium 100 is described using a flowchart of FIG. 7 as with FIG. 6. The processing shown in the figure is characterized, as compared with the conventional processing, for example in the modified processing for determining whether or not an area in which data is currently being recorded and its adjacent area are areas including a defect. Note that the following processing is executed under the control of the signal processing unit 403.

During recording data, the optical information recording/reproducing device 400 performs recording processing, first (S501). Next, every time a constant amount of data is recorded or at a constant time interval, it is determined whether or not any recording error occurs (S502). Where there is no recording error in S502, it is confirmed whether or not the recording has completed (S503), and if not, the recording processing 501 is continued until the recording is completed.

Moreover, where it is determined in 5502 that a recording error occurs, it is determined whether or not the same defect detection area 301 as the one including an address at which data is being recorded or its adjacent defect detection area 301 has been registered in the defect area information 1302 included in the defect management information 1300 (S601). Note that, if in S601 the defect management information 1300 is read out to a memory (not shown) of the optical information recording/reproducing device 400, for example at the time of recognition of the optical information recording medium 100 so that the defect management information 1300 may not be read during recording information, then the data read time can be conveniently reduced. Moreover, its adjacent defect detection area 301 refers to the defect detection area 301 adjacent at the inner circumference side and the outer circumference side relative to the defect detection area 301 in which a recording error occurs.

Where in S601 the same defect detection area 301 as the one including an address at which data is being recorded or its adjacent defect detection area 301 has been registered in the defect area information included in the defect management information 1300, a specified number of retries is changed (S602). In S602, with regard to the number of retries, for example, where video data requiring real-time recording is recorded, the specified number of retries is set to zero so as not to perform retry, and thereby real-time recordability can be improved.

Moreover, even if data requiring real-time recording is not recorded, where a defect has been found in the same defect detection area 301 as the one including an address at which data is being recorded or its adjacent defect detection area 301, presumably the cause of the recording error is most likely due to the defect. So, the optical information recording/reproducing device 400 may be configured to control so as to reduce the number of retries where a defect has been found, as compared with the case where a defect has not been found. This enables the optical information recording/reproducing device 400 to suppress a decrease in the recording speed due to the time required for retry processing.

Next, the optical information recording/reproducing device 400 determines whether or not retry has been performed the specified number of times or more (S504). Where the retry has been performed fewer than the specified number of times, the optical information recording/reproducing device 400 performs retry pre-processing such as a positioning process of the optical pickup (S508), and then performs the recording processing again (S501). Where the retry has been performed the specified number of times or more in S504, the optical information recording/reproducing device 400 detects whether or not there is any defect on the optical information recording medium 100 (S505). Thereafter, in S506, it is determined whether or not any defect is detected on the optical information recording medium 100. Where a defect is detected in S506, the defect detection area 301 is registered in the defect management information 1300 (S507), and then the optical information recording/reproducing device 400 completes the recording as an error.

The optical information recording/reproducing device 400 similarly completes the recording as an error even where it could not find a defect on the optical information recording medium 100 in S506.

Other than this example, in S602, the optical information recording/reproducing device 400 may also not only change the specified number of retries but also change the recording speed or change the recording method to a read-after-write method so that stable recording is possible. This increases the possibility to successfully record at the time of retry.

Thus, the optical information recording/reproducing device 400 perform the processing modified so as to treat the same defect detection area 301 as the one including a defect and its adjacent defect detection areas 301, as a defect area that includes a defect or is most likely to include a defect.

Moreover, the above-described optical information recording/reproducing device 400 provides the following advantages. That is, where the presence of a defect has been detected in a certain layer, a range in the other layer potentially affected by this defect will expand due to the bonding error. Against this problem, the optical information recording/reproducing device 400 can perform suitable processing in the areas in which a defect is most likely to be detected again, by changing the number of retries or the recording method in the defect detection area 301 including a portion at which data is being recorded and the defect detection areas 301 adjacent at the inner circumference side and the outer circumference side. Moreover, to put it the other way around, the optical information recording/reproducing device 400 can suppress the range in radial direction in which the number of retries or the recording method is to be changed, to three times the width of the defect detection area 301. Accordingly, it is possible to inhibit changing the number of retries or the recording method at a portion at which normally a defect is not most likely to be detected as a result of taking the range in radial direction too wide.

Note that, in the above-described embodiment, it is determined in S601 whether or not the same defect detection area 301 and its adjacent defect detection area 301 have been registered as a defect area but the determination may be made just for the same defect detection area 301. This is because a defect of the other layer is most likely to be included in the same defect detection area 301.

Meanwhile, in the above-described detection processing in S601, a relationship between a layer in which data had been recorded when the presence of a defect was detected and a layer in which data is currently being recorded is not taken into consideration for the purpose of suppressing complication of the processing.

However, in the detection processing, the relationship between a layer in which data had been recorded when the presence of a defect was detected and a layer in which data is currently being recorded may be taken into consideration. Hereinafter, the details are described.

That is, where a layer in which data had been recorded when the presence of a defect was detected and a layer in which data is currently being recorded are different, the presence of a defect not only in the same defect detection area 301 but also in its adjacent defect detection area 301 is most likely to be detected. If a layer in which data had been recorded when the presence of a defect was detected and a layer in which data is currently being recorded are the same, there is no need to take the bonding error into consideration.

Accordingly, in the optical information recording/reproducing device 400, the signal processing unit 403 may execute a process of determining whether a layer in which data had been recorded when the presence of a defect was detected and a layer in which data is currently being recorded are the same or different. Furthermore, where a layer in which data had been recorded when the presence of a defect was detected and a layer in which data is currently being recorded are the same, the signal processing unit 403 may execute a process of determining whether or not only the same defect detection area 301 has been registered in the defect area information. Moreover, where a layer in which data had been recorded when the presence of a defect was detected and a layer in which data is currently being recorded are different, the signal processing unit 403 may execute a process of determining whether or not only the same defect detection area 301 has been registered in the defect area information.

In the case of recording data in the same layer as the one in which data had been recorded when the presence of a defect was detected, such a configuration suppresses the possibility to execute processes such as a process of reducing the number of retries although there is no defect in the adjacent defect detection area 301.

Embodiment 3

Next, Embodiment 3, is another operation example of the optical information recording/reproducing device 400 during recording on the optical information recording medium 100 on which defect information is already recorded. Note that a characteristic operation example among the operation examples in Embodiment 3 is that when information is recorded at a portion that is already registered as the defect detection area 301, the information is recorded after changing the recording method.

Figure 8:
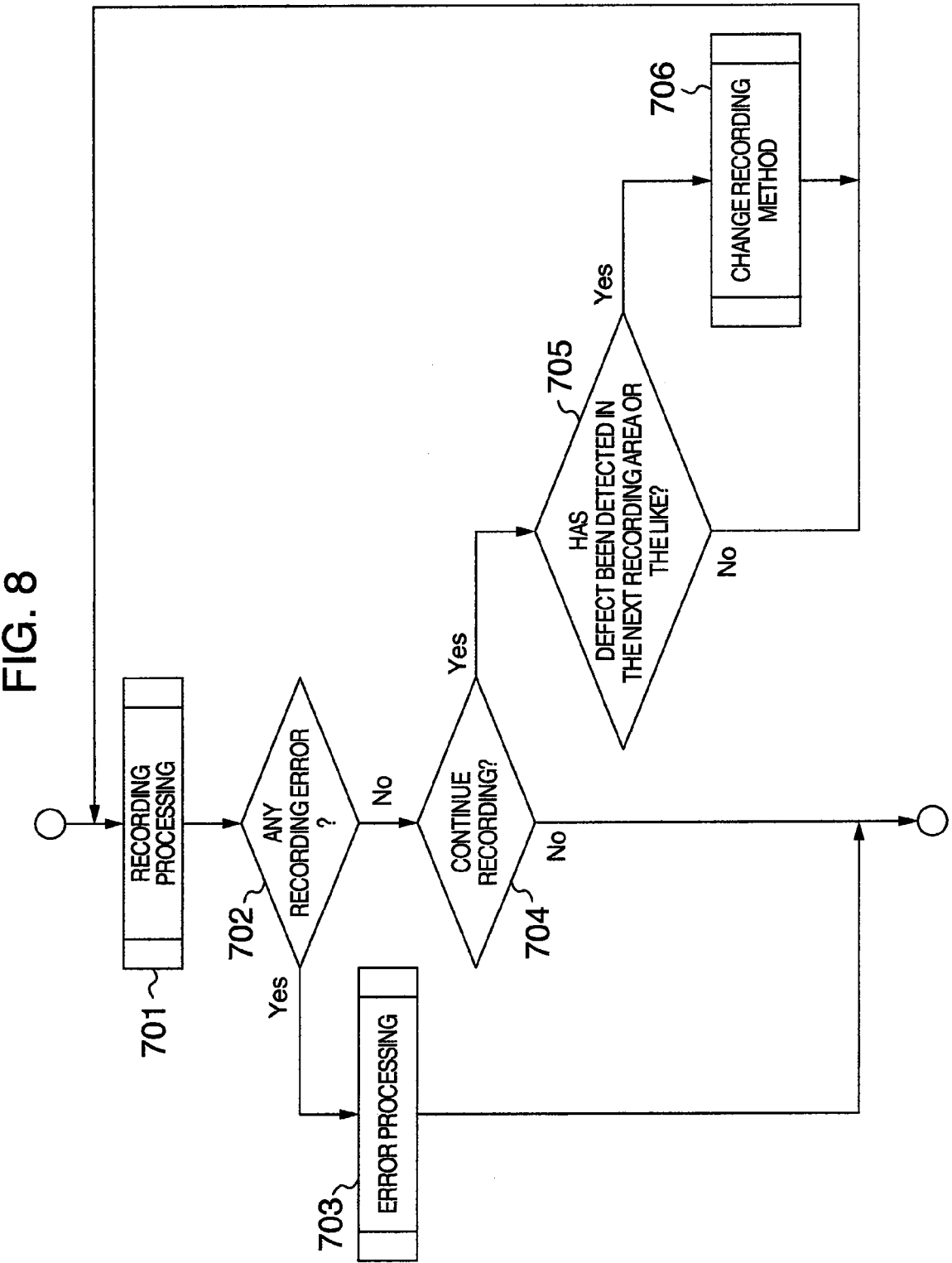
FIG. 8 is an example of a flowchart of recording using a defect detection area (Embodiment 3).

FIG. 8 shows a flowchart of the operation in the case of recording on the defect detection area 301 in which a defect is already detected during recording or its adjacent defect detection area 301. Note that the following processing is executed under the control of the signal processing unit 403.

In the data recording operation of the optical information recording/reproducing device 400, recording processing of a constant-interval (S701), determination of whether or not there is any error (S702), and monitoring of whether or not to continue recording (S704) are repeated. Here, the constant-interval may refer to any of one cluster, one mark, a constant time interval, or the like in the case of a Blu-Ray Disc, for example.

Where there is a recording error in S702, the optical information recording/reproducing device 400 moves to S703, in which it performs error processing and then completes the recording processing. Note that, the error processing here corresponds to the processing of S601, S602, and the like in FIG. 7, for example.

On the other hand, where there is no recording error in S702, the optical information recording/reproducing device 400 moves to S704, in which it determines whether or not to continue recording (S704). In the monitoring of whether or not to continue recording (S704), the optical information recording/reproducing device 400 determines whether or not the same defect detection area 301 as the one including an address at which data is being recorded or its adjacent defect detection area 301 has been recorded in the defect area information 1302 (S705). Note that, the optical information recording/reproducing device 400 may execute a process, in which information about whether or not there is any defect in the defect detection area 301 is read out to a memory (not shown) at the time of recognition of the optical information recording medium 100, for example. This prevents the optical information recording/reproducing device 400 from reading the corresponding area again to conveniently reduce the data read time.

Where recording is continued in 5704, the optical information recording/reproducing device 400 determines whether or not any defect is already detected in the defect detection area 301 in which recording is to be performed next, or in its adjacent defect detection area 301 (S705). Where a defect is detected in S705, the optical information recording/reproducing device 400 performs a process for changing the recording method (S706).

The process for changing the recording method in S706 include a process for changing the recording speed to a slower recording speed (slower data transfer rate), and a process for changing the constant-rotational-speed recording capable of stabilizing recording quality to the constant-linear-speed recording. The process for changing the recording method can enhance the resistance against defects. Then, the optical information recording/reproducing device 400 can increase the possibility to continue recording even where there is a defect.

Furthermore, if, using the read-after-write method as the recording method, data is recorded by reading recorded data and confirming that the data is recorded, then the recording quality at a defect portion can be secured.

Moreover, where recording is not continued in S704, the optical information recording/reproducing device 400 completes the recording processing. Note that recording is not continued, for example where a command to cancel recording from the host device 404 is received.

Note that in the above-described embodiment, it is determined in S705 whether or not the same defect detection area 301 and its adjacent defect detection area 301 have been registered as the defect area, but the determination may be made just for the same defect detection area 301.

Embodiment 4

Embodiment 4 is an operation example of an optical information reproducing device 400' during reproducing from the optical information recording medium 100 on which defect information is already recorded. Note that the block diagram of the optical information reproducing device 400' in this embodiment corresponds to the one of FIG. 1. It is needless to say that the optical information recording/reproducing device 400 can also execute the following processing.

Figure 9:
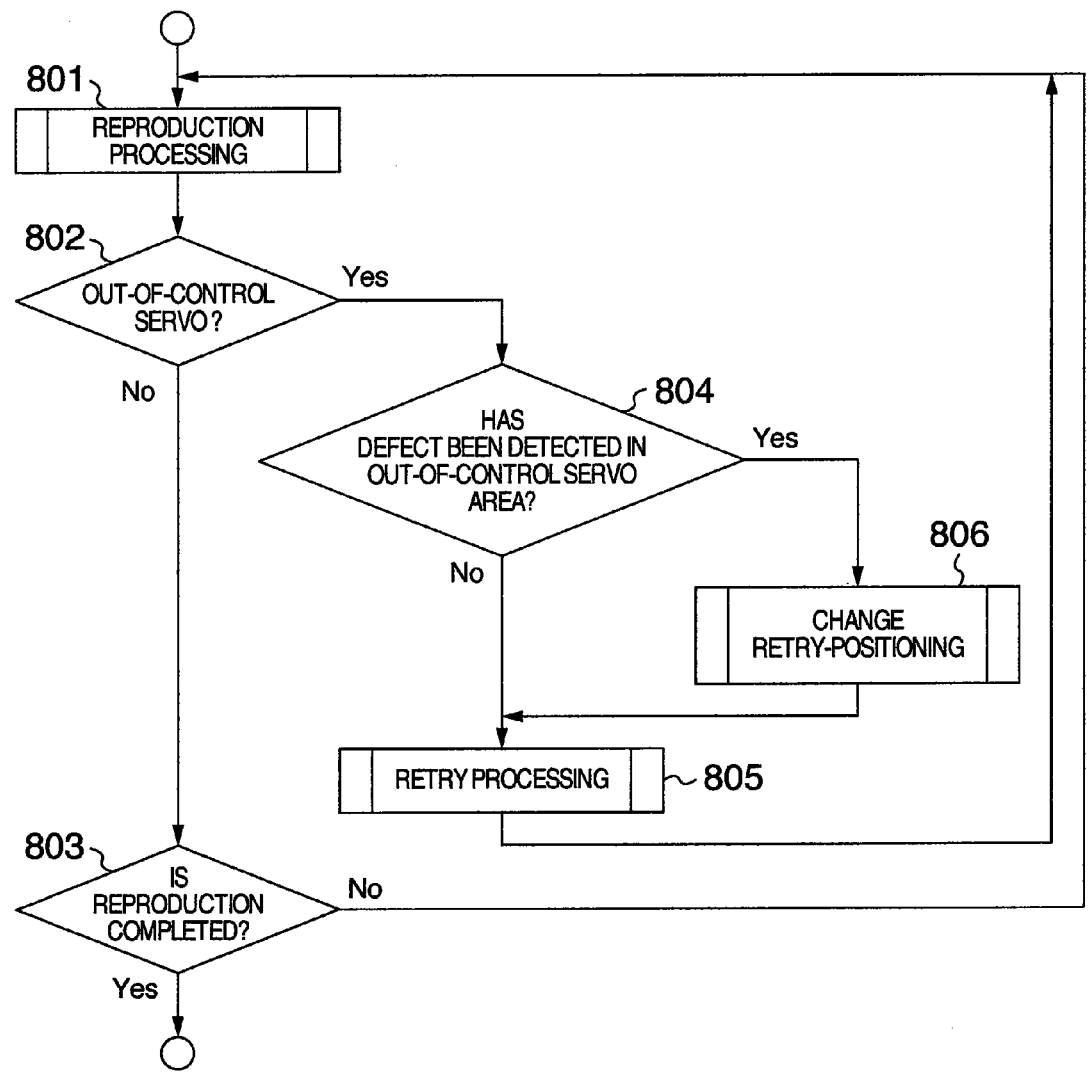
FIG. 9 is an example of a flowchart of retry using a defect detection area during reproduction (Embodiment 4).

First, a flowchart of the operation in the case where a reproduction error occurs due to a defect during reproducing is described using FIG. 9. Note that the following processing is executed under the control of the signal processing unit 403.

Upon receipt of a reproduction instruction, the optical information reproducing device 400' reproduces data (S801).

Thereafter, the optical information reproducing device 400' performs reproduction processing of a constant-interval (S801), out-of-control servo detection (S802), and reproduction completion check (S803), repeatedly. Here, the constant interval may be any of one cluster, one mark, a constant time interval or the like, in the case of a Blu-Ray Disc, for example.

In S802, the optical information reproducing device 400' detects whether or not servo is out-of-control. Where servo is not out-of-control in S802, the optical information reproducing device 400' moves to S803, in which it determines whether or not to complete the reproduction processing. Then, where reproduction is completed in S803, the optical information reproducing device 400' completes the processing. Note that reproduction is completed in S803, for example where a command to complete reproduction is received from the host device 404. Moreover, the out-of-control servo refers to the case where the deviation amount of servo from the optimum value is equal to or greater than a predefined value.

On the other hand, if the reproduction is not completed in S803, the optical information reproducing device 400' moves to S801, in which it performs the data reproduction processing for the next constant interval.

Moreover, where out-of-control servo is detected in S802, the optical information reproducing device 400' moves to S804, in which it determines whether or not the defect detection area 301 including a position at which the out-of-control servo occurs has been registered in the defect area information.

In S804, where the defect detection area 301 including an address at which the out-of-control servo is detected or its adjacent defect detection area 301 has been recorded in the defect area information, it is presumed that the out-of-control servo is most likely to be caused by the defect. Therefore, it is presumed that if the servo control is started over again in the same defect detection area 301 as the one in which an error occurs, then out-of-control servo is most likely to occur again.

Then, in S804, if a defect has been registered in the defect detection area 301 in which out-of-control servo is detected or in its adjacent defect detection area 301 in S802, the optical information reproducing device 400' changes retry positioning in S806. Specifically, in the retry processing S805, the optical information reproducing device 400' changes a position at which servo pull-in is to be performed from the same defect detection area 301 or its adjacent defect detection area 301 to a position at which any defect has not been registered. This increases the probability that the optical information reproducing device 400' can execute retry processing at a portion at which there is no defect.

On the other hand, where an area including a position at which the out-of-control servo is detected and its adjacent area have not been registered in the defect area information 1302, the optical information reproducing device 400' performs retry processing (S805). Then, after retry processing, the optical information reproducing device 400' moves to S801 again to perform the reproduction processing.

Note that, in the above-described embodiment, it is determined in S804 whether or not the same defect detection areas 301 and its adjacent defect detection area 301 have been registered as a defect area, but the determination may be made just for the same defect detection area 301.

Moreover, in S805 of this embodiment, if the area in which the servo pull-in is to be performed is an area other than the defect detection area 301 including an address at which the out-of-control servo is detected and its adjacent defect detection area 301 and is also located at a position close to an address at which reproduction is performed, then the stability in servo pull-in can be achieved and a decrease in the speed of reproduction retry can be suppressed.

Thus, the optical information reproducing device 400' performs the processing modified so as to treat the same defect detection areas 301 as the one including a defect and its adjacent defect detection areas 301, as a defect area that includes a defect or is most likely to include a defect.

Embodiment 5

Embodiment 5 is an operation example of the optical information recording/reproducing device 400 in the case where the optical information recording medium 100 does not have an area for recording the defect area information 1302.

Figure 10:
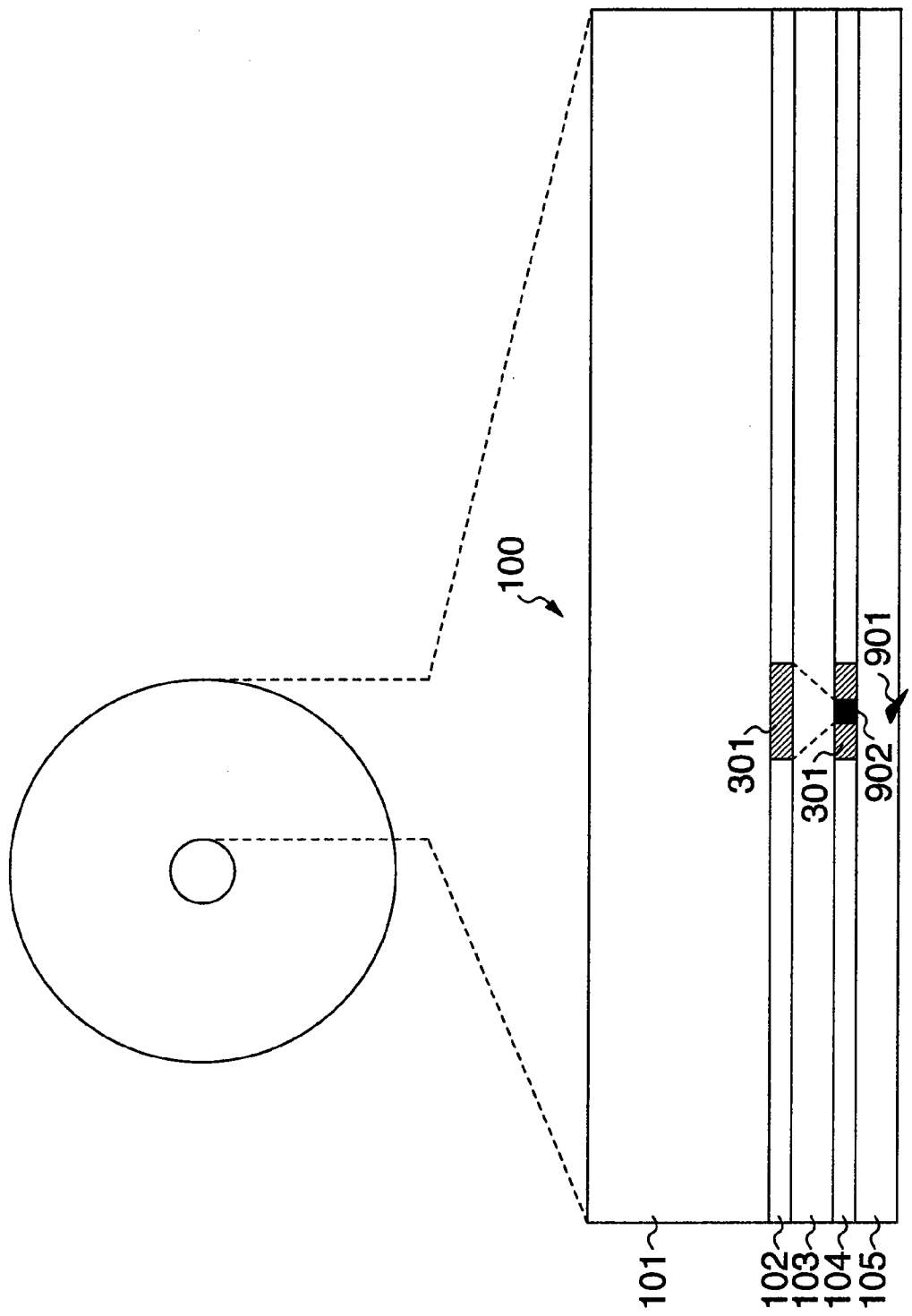
FIG. 10 is an example showing a method for estimating defects in the case where defect information about a defect detection area is not recorded (Embodiment 5).

First, a method for predicting a defect position in the case where the optical information recording medium 100 does not have an area for recording the information about the defect detection area 301 is described using FIG. 10.

For example, where data is read or recorded from/on the second recording layer 104 of the optical information recording medium 100, the scratch 901 on the surface of the optical information recording medium 100 is detected as the defect 902 of the second recording layer 104 due to a recording or reproduction error.

Here, the optical information recording/reproducing device 400 acquires the defect detection area 301 including a portion at which a defect is detected, from the address of the detected defect and the area definition information 1200, for example. Then, the optical information recording/reproducing device 400 stores the presence of a defect in the defect detection area 301, into a memory (not shown) provided in the optical information recording/reproducing device 400.

Thereafter, in the method for recording/reproducing, a defect position of the other layer can be estimated by performing the processing as in Embodiments 2 to 4, even where the optical information recording medium 100 does not have an area for recording the defect area information 1302. Where a defect is already registered in the defect management area of the optical information recording medium 100, a defect in a multilayer disc can be estimated as with the above-described case where a defect is found, by calculating which defect detection area 301 corresponds to this defect from the registered defect address and storing the presence of the defect in the defect detection area 301 into the optical information recording/reproducing device or a memory of the optical information recording/reproducing device. This enables the methods for recording/reproducing described in Embodiment 2, Embodiment 3, and Embodiment 4 to be implemented.

This approach can reduce spent capacity of the optical information recording medium 100 because there is no need to record information about whether or not there is any defect in the defect detection area 301 on the optical information recording medium 100. Moreover, where the optical information recording/reproducing device 400 of this embodiment is used, it is possible to modify the number of retries and the like with respect to an area that is most likely to include a defect, even in the case of media without an area for recording the defect area information 1302.

Moreover, the optical information recording/reproducing device 400 may be configured so as for the signal processing unit 403 to detect whether or not a recording medium includes any area for registering the defect detection area 301 based on the BCA or the management area, for example.

According to the optical information recording/reproducing device 400, the optical information reproducing device 400', and the optical information recording medium 100 of the above-described embodiments, in an optical information recording medium including a plurality of recording layers, the recording speed and an improvement in safe data recording can be improved by estimating the defect position of a current layer from the defect information about a layer in which information is currently not recorded, and by changing the number of retries or the recording speed.

Note that, the present invention is not limited to the above-described embodiments, but includes various modified embodiments. Moreover, although the above-described embodiments have been described in detail in order to clearly describe the present invention, the present invention is not necessarily limited to the embodiments including all the described configurations. Moreover, it is possible to replace a part of the configuration of a certain embodiment with a configuration of another embodiment, and it is also possible to add a configuration of an alternative embodiment to the configuration of a certain embodiment. Moreover, it is possible to add another configuration to a part of the configuration of each embodiment, to remove a part of the configuration of each embodiment, or to replace it with another configuration.

Moreover, for each above-described configuration, a part or all thereof may be configured in hardware or may be configured so as to be realized by programs executed by a processor. Moreover, control lines and information lines considered to be required for the purpose of description are described, but all control lines or information lines required for a product are not necessarily described. Actually, almost all the elements are considered to be connected to each other.

For example, the present invention can be applied to data recording on the optical information recording medium including such as a DVD or a Blu-Ray Disc, in order to change it to multilayer recording medium, while maintaining the recording speed and the reliability of the processing.

The invention claimed is:

1. An optical information recording or reproducing device for recording or reproducing information on/from an optical information recording medium including a first layer and a second layer, the optical information recording or reproducing device comprising:
   a pickup for irradiating the optical information recording medium with a laser;
   a motor for rotating the optical information recording medium;
   a defect detector for detecting a defect from a signal read from the pickup;
   a memory for separately storing an address of the defect detected by the defect detector and associated defect area information identifying an area potentially affected by the detected defect; and
   a controller that controls the recording or reproducing of information on the optical information recording medium,
   wherein:
      when the defect is detected during recording of information in the first layer, the controller is configured to control the recording or reproducing of information such that a predefined area of the second layer corresponding to the detected defect in the first layer is registered as the associated defect area in the memory, and
      in response to the recording or reproducing of information failing at the detected defect address, the controller is further configured to control the recording or reproducing of information so as to change a retry operation in the area potentially affected by the detected defect.

2. The optical information recording or reproducing device according to claim 1, wherein the controller controls to read information indicating a defect area list from the optical information recording medium.

3. The optical information recording or reproducing device according to claim 1, wherein the change of a retry operation refers to reduction of a number of retries or performing no retry.

4. The optical information recording or reproducing device according to claim 1, wherein the change of a retry operation refers to change of a recording speed and a recording method.

5. An optical information recording or reproducing device for recording or reproducing information on/from an optical information recording medium including a first layer and a second layer, the optical information recording or reproducing device comprising:
   a pickup for irradiating the optical information recording medium with a laser;
   a motor for rotating the optical information recording medium;
   a defect detector for detecting a defect from a signal read from the pickup; and
   a controller that controls the recording of information on the optical information recording medium,
   wherein when the defect is detected in a defect detection area of the first layer predefined based on a physical radius of the optical information recording medium during recording of information in the first layer, the controller treats as a defect area one or more predefined defect detection areas in the second layer associated with the predefined defect detection area of the first layer including the detected defect position, and wherein a radial distance of each of the predefined defect detection areas is equal to or greater than a bonding error between the first layer and the second layer.

6. An optical information recording or reproducing device for recording or reproducing information on/from an optical information recording medium including a first layer and a second layer, the optical information recording or reproducing device comprising:
- a pickup for irradiating the optical information recording medium with a laser;
- a motor for rotating the optical information recording medium;
- a defect detector for detecting a defect from a signal read from the pickup;
- a memory for separately storing an address of the defect detected by the defect detector and associated defect area information identifying an area potentially affected by the detected defect; and
- a controller that controls the recording or reproducing of information on the optical information recording medium, wherein:
- when the defect is detected during recording of information in the first layer, the controller is configured to control the recording or reproducing of information such that a predefined area of the second layer corresponding to the detected defect in the first layer is registered as the associated defect area in the memory, and
- in response to the recording or reproducing of information failing at the detected defect address, the controller is configured to change a retry operation in the case of failure to record or reproduce information in the area potentially affected by the detected defect and in an area adjacent to the area.

7. An optical information reproducing device for reproducing information from an optical information recording medium including a first layer and a second layer, the optical information reproducing device comprising:
- a pickup for irradiating the optical information recording medium with a laser;
- a motor for rotating the optical information recording medium;
- a memory for separately storing an address of the defect detected by the defect detector and associated defect area information identifying an area potentially affected by the detected defect; and
- a controller that controls the reproducing of information on the optical information recording medium wherein, in response to the reproducing of information failing at the detected defect address, the controller is configured to change a retry operation in the case of failure to reproduce information in the area potentially affected by the detected defect.

8. The optical information reproducing device according to claim 7, wherein the controller controls to read information indicating a defect area list from the optical information recording medium.

9. The optical information reproducing device according to claim 7, wherein the controller does not perform a focus servo pull-in in the defect area and an area adjacent to the defect area.

10. An optical information reproducing device for reproducing information from an optical information recording medium including a first layer and a second layer, the optical information reproducing device comprising:
- a pickup for irradiating the optical information recording medium with a laser;
- a motor for rotating the optical information recording medium; and
- a controller that controls the reproducing of the information on the optical information recording medium,
- wherein when the presence of a defect in a defect detection area of the first layer predefined based on a physical radius of the optical information recording medium has been registered, the controller treats as a defect area one or more predefined defect detection areas in the second layer associated with the predefined defect detection area of the first layer including the registration position of the defect, and
- wherein a radial distance of each of the predefined defect detection areas is equal to or greater than a bonding error between the first layer and the second layer.

* * * * *